April 28, 1964  B. R. McHENRY  3,130,807
AIR CUSHION DASHBOARD FOR AUTOMOBILES AND THE LIKE
Filed July 5, 1962

INVENTOR
*Bobby R. McHenry.*

United States Patent Office 3,130,807
Patented Apr. 28, 1964

3,130,807
AIR CUSHION DASHBOARD FOR AUTOMOBILES
AND THE LIKE
Bobby R. McHenry, 1150 N. 37th St.,
Kansas City 2, Kans.
Filed July 5, 1962, Ser. No. 207,550
4 Claims. (Cl. 180—90)

This invention relates to vehicles and more particularly to that vehicle known the world over as an automobile although it can, as will be seen from this specification, be adapted to any other conveyance in which people ride such as the airplane, boats or sled.

With the ever-increasing number of vehicles of all kinds and size on the highways, in the sky and on the waterways, man is continually on the search for reducing the number of injuries people receive in accidents when they are thrown forwardly against the dashboard of the vehicle in which they are riding.

It is, therefore, an object of this invention to provide an air cushioned dashboard for automobiles and the like that will prevent the people in the seat nearest to the same from being injured when thrown against the dashboard in an accident.

Another object of this invention is to provide an air cushioned dashboard for vehicles and the like that will provide additional safety in the vehicle in which it is installed without detracting from its external appearance.

Another object of this invention is to provide an air cushioned dashboard of the character herein described that can readily be adapted to any vehicle.

Another object of this invention is to provide an air cushioned dashboard for any vehicle which increases its safety without increasing its initial cost of manufacture.

Still another object of this invention is to provide an air cushioned dashboard that can readily be manufactured by any rubber company or manufacturer of automotive parts of similar material.

Other and further objects and advantages of this air cushioned dashboard for automobiles and the like will be hereinafter described, and the novel features thereof defined in the appended claims.

Referring to the drawing.

Similar reference characters refer to similar parts throughout the several views of the drawing.

Figure 1:
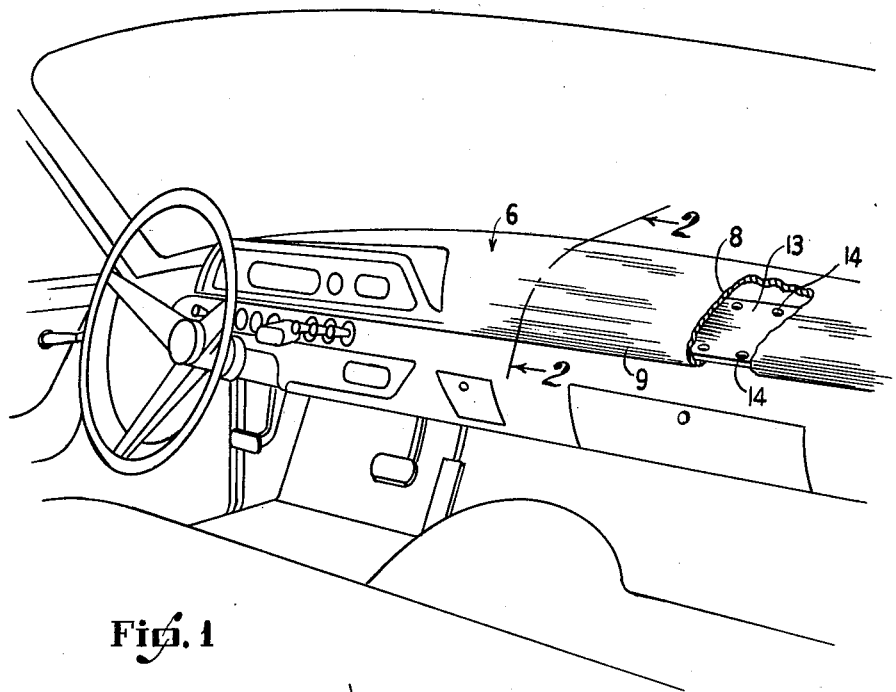
FIGURE 1 is a pictorial view of a preferred embodiment of this invention installed in an automobile.
Figure 2:
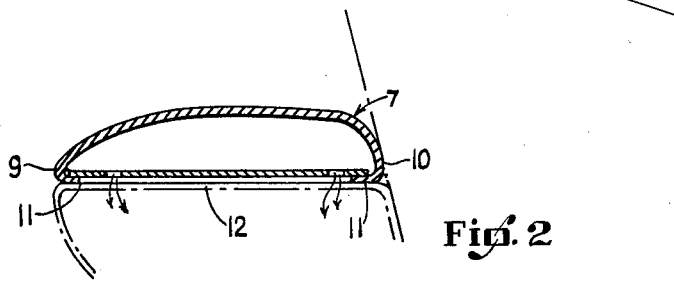
FIGURE 2 is a sectional view taken substantially along line 2—2 of FIGURE 1 as viewed in the direction indicated by the arrows.
Figure 3:
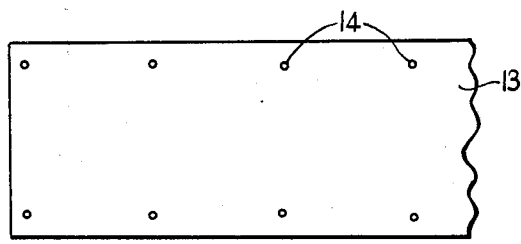
FIGURE 3 is an underside view of a portion of the preferred embodiment.

Having reference now to the drawing in detail, reference numeral 6 indicates generally an air cushioned dashboard constructed in accordance with the invention. The main body of the dashboard comprises the elongate top member 7 which is convex in configuration and has the upper wall portion 8 smoothly curved into the long side walls as at 9 and 10 and is provided with an inturned lip 11. The member 7 may be supported in the vehicle in any convenient fashion, such as by resting the lower edge upon the structural portion 12 of the automobile.

A rectangular bottom plate 13 is provided to close the open bottom of the member 7, this having a plurality of equally spaced openings 14 located generally around the periphery of the plate and inset from the edge. The bottom plate is fitted within and rests upon the lip 11. It defines with the member 7 an air space within the dashboard.

The upper elongated convex member 7 is constructed of a resiliently deformable material, preferably being molded of a suitable plastic or rubber. The bottom plate 13 of the illustrated embodiment is made of plastic sheet.

In the operation of the invention, the walls of the convex member 7 normally assume the position illustrated in the drawing. However, upon impact of a human or other object thereagainst, such as might occur during a collision or quick stop, it tends to collapse. Rapid collapse is prevented, however, by the compression of the air within the air space. The openings 14 restrict and regulate the flow of air from the space and act to retard the rate of collapse. The air itself within the air space serves as a preliminary shock absorbing cushion, yet it escapes through openings 14 and slowly decelerates the object which has struck the surface and there is less tendency for the impacting object or person to bounce back off the dashboard. In other words, the convex member 7 can collapse if the external pressure is applied for a sufficient period, yet the rate of collapse will be much slower than if the air cushion were not present. The moment any pressure placed on the dashboard is removed, the openings 14 act as air inlets and air reenters the convex member 7 thereby permitting the same to return to its original and normal shape.

From the foregoing it will now be seen that there is herein provided an air cushioned dashboard for automobiles and the like which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

What I now claim as my invention is:

1. An air cushioned dashboard for automobiles and the like, said dashboard comprising a convexly shaped top member having top and side wall portions and in which at least the side wall portions thereof are constructed of self-supporting but resiliently flexible material, a bottom plate closing the underside of said top member and providing with the top member an air space therebetween, the exterior of said top member serving as the dashboard surface, and restricted air passage means providing communication between said space and the exterior of said dashboard, said means operable to regulate the exhaust rate of air from said space upon impact deformation of said top member toward said bottom member whereby to provide a controlled rate of collapse of said top member yet permitting air to re-enter said space and the return of said top member under the influence of its own resilience to its normal configuration upon removal of the force acting on the top member.

2. An air cushioned dashboard for automobiles and the like, said dashboard comprising a convexly walled top member constructed of resilient material and having a normal self-supporting configuration in which the exterior of the top member serves as the dashboard surface, a bottom member closing the underside of said top member and forming with the top member an air space therebetween, and air passage means permitting controlled escape of air from said space in response to flexing of said top member toward said bottom member and the return of air to said space as said top member returns under its own resilience toward its normal condition.

3. An air cushioned dashboard as in claim 2 wherein said air passage means comprise a plurality of small openings through said bottom member.

4. An air cushioned dashboard as in claim 2 wherein said air passage means communicates between said space and the surrounding atmosphere.

References Cited in the file of this patent

UNITED STATES PATENTS

| | | |
|---|---|---|
| 2,649,311 | Hetrick | Aug. 18, 1953 |
| 2,781,203 | Kurilenko | Feb. 12, 1957 |
| 2,806,737 | Maxwell | Sept. 17, 1957 |
| 2,827,305 | Graham | Mar. 18, 1958 |
| 2,844,387 | Shaw | July 22, 1958 |